C. F. GAILOR.
RAIL JOINT.
APPLICATION FILED FEB. 25, 1915.
1,212,204.
Patented Jan. 16, 1917.
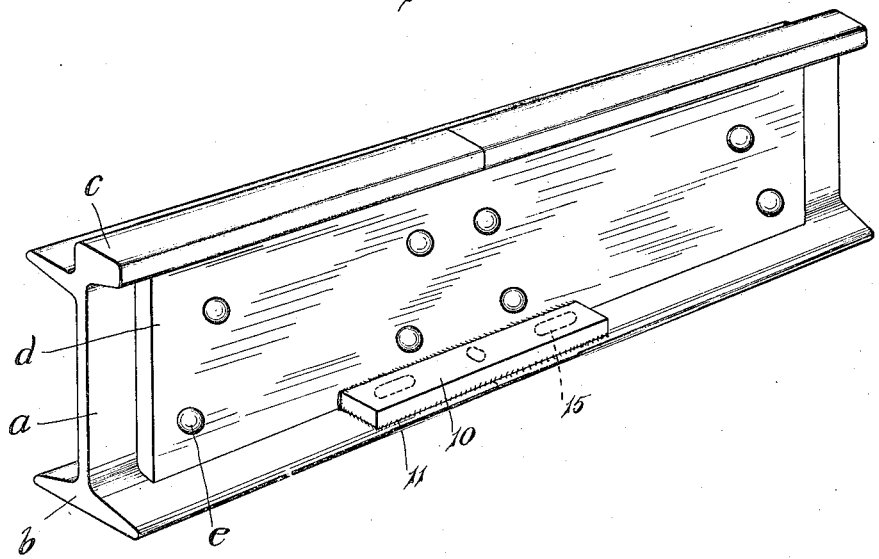
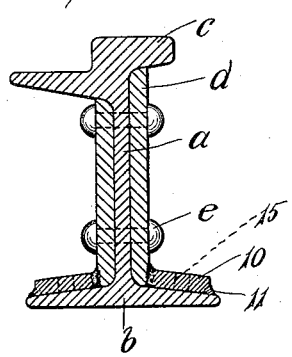
WITNESSES:
INVENTOR.
Chester F. Gailor:
BY
ATTORNEY.

UNITED STATES PATENT OFFICE.

CHESTER F. GAILOR, OF BALTIMORE, MARYLAND.

RAIL-JOINT.

1,212,204.     Specification of Letters Patent.     Patented Jan. 16, 1917.

Application filed February 25, 1915. Serial No. 10,395.

*To all whom it may concern:*

Be it known that I, CHESTER F. GAILOR, a citizen of the United States, and a resident of Baltimore, in the State of Maryland, have invented certain new and useful Improvements in Rail-Joints, of which the following is a specification.

This invention relates to improvements in welded rail joints, the object being to provide a means by which many existing bolted or riveted joints can be readily transformed into a welded joint in such manner that the welding may be done with the greatest possible ease, and perfect union of the parts secured, resulting in materially strengthening and stiffening the joint and in materially increasing its electrical conductivity. Of course this invention is applicable to joints as newly made, as well as to old joints.

In the drawings Figure 1 is a perspective view of a joint made in accordance with my invention. Fig. 2 is a transverse section thereof.

Referring to the drawings, $a$ denotes a rail of any desired cross section; $b$ the base thereof, and $c$ the head.

$d$ is the usual joint plate, riveted or bolted in the customary manner, $e$ indicating such rivets or bolts. These plates customarily fit closely between the head and base of the rail, and the joint as thus far described is of usual and ordinary construction.

My invention resides in applying to a joint thus formed a plate 10 of material that will insure the very best possible weld, and welding this plate to the base of the rail, either along its edges as indicated at 11, or if additional welding surface is needed it may be secured by cutting apertures through the plate as indicated in dotted lines at 15, and welding in these apertures. Where the welding plate is placed on the upper side of the rail bases, an edge may be welded to the joint plate $d$. The welding plate may be located underneath the rail bases and the welding carried on through apertures formed in the bases, or otherwise. As a result of this construction, the rigidity and strength of the joint are greatly increased, and the welded connection between the ends of the rails insures a perfect bonding of the two rail sections, and consequently an increase in conductivity of the rail.

An important and advantageous feature of this invention is that in a track already laid, the joints can be welded without disturbing them, and the welding is accomplished at such a place and in such a manner that the welding plate can be securely united to the rails and to the joint plate if desired without disturbing any of the parts of the old joint. Thus is the work greatly facilitated and the cost of the welding reduced.

I have described the usual form of mechanical rail joint which I prefer to use, comprising fish plates at both sides of the rail web held in place by headed fasteners. However, it is obvious that a change in the number of fish plates or their equivalents, and in the method of securing them in place would not constitute a departure from the invention as pointed out in some of the claims.

I claim as my invention:—

1. A welded rail joint, comprising the combination with a mechanically formed joint including fish plates overlapping and secured to the adjacent ends of rails by headed fasteners, of a welding plate overlapping the ends of the rail bases, and a welded connection between said welding plate and the bases of said rails.

2. A welded rail joint comprising the combination with a mechanically formed joint including fish plates overlapping and secured to the adjacent ends of rails by headed fasteners, of a plate located on and overlapping the ends of the rail bases, and a welded connection between said plate and the bases of said rails and a fish plate.

3. A rail joint comprising the combination with abutting rail ends and a plate located against a side of and overlapping said rail ends and secured thereto, of a rigid non-elastic member of welding material overlapping the abutting ends of the bases of said rails, and a welded connection between said member and the bases of said rails.

CHESTER F. GAILOR.

Witnesses:
GILBERT A. WEHR,
HELEN A. GALE.